(12) United States Patent
Wang

(10) Patent No.: US 10,702,963 B2
(45) Date of Patent: Jul. 7, 2020

(54) INDICATION LAMP DEVICE WITH COUNTDOWN DISPLAY

(71) Applicant: LET-WIN TECH CO., LTD., Taichung (TW)

(72) Inventor: Chi-Hsien Wang, Taichung (TW)

(73) Assignee: LET-WIN TECH CO., LTD., Taichung (TW)

( * ) Notice: Subject to any disclaimer, the term of this patent is extended or adjusted under 35 U.S.C. 154(b) by 0 days.

(21) Appl. No.: 16/249,273

(22) Filed: Jan. 16, 2019

(65) Prior Publication Data
US 2019/0366498 A1 Dec. 5, 2019

(51) Int. Cl.
| | |
|---|---|
| *B23Q 17/24* | (2006.01) |
| *F21S 43/14* | (2018.01) |
| *F21S 43/15* | (2018.01) |
| *F21V 7/00* | (2006.01) |
| *F21S 8/08* | (2006.01) |
| *F21V 9/08* | (2018.01) |
| *H05B 47/16* | (2020.01) |
| *F21Y 115/10* | (2016.01) |
| *F21W 111/00* | (2006.01) |

(52) U.S. Cl.
CPC .......... *B23Q 17/2404* (2013.01); *F21S 8/083* (2013.01); *F21S 43/14* (2018.01); *F21S 43/15* (2018.01); *F21V 7/0008* (2013.01); *F21V 9/08* (2013.01); *H05B 47/16* (2020.01); *F21W 2111/00* (2013.01); *F21Y 2115/10* (2016.08)

(58) Field of Classification Search
None
See application file for complete search history.

(56) References Cited

U.S. PATENT DOCUMENTS

| | | | | |
|---|---|---|---|---|
| 2001/0027354 | A1* | 10/2001 | Kakino | G05B 19/4163 700/173 |
| 2011/0187214 | A1* | 8/2011 | Jan | H02K 11/00 310/73 |
| 2014/0362564 | A1* | 12/2014 | Giblett | F21S 9/035 362/183 |

\* cited by examiner

*Primary Examiner* — Britt D Hanley
(74) *Attorney, Agent, or Firm* — Behmke Innovation Group LLC; James M. Behmke; Jonathon P. Western

(57) ABSTRACT

Provided is an indication lamp device with a countdown module, including: a lamp body structure and a controller. The lamp body structure is installed on an apparatus machine erectly and has a body and a light guiding mask. The body is provided with a time displaying module and a plurality of light emitting modules. The time displaying module is installed along an elongated direction of the body. The light guiding mask is transparent and masks the body. The controller is coupled to the body and the apparatus machine for receiving an operating state signal and a machining time signal of the apparatus machine and controlling the light emitting module to emit light and the time displaying module to display the machining countdown based on the operating state signal and the machining time signal, allowing operators to control the operating state and machining time of the apparatus machine effectively.

13 Claims, 6 Drawing Sheets

INDICATION LAMP DEVICE WITH COUNTDOWN DISPLAY

RELATED APPLICATION

This application claims the benefit of Taiwanese Patent Application No. 107207162, filed on May 30, 2018, the entire content of which is incorporated herein.

BACKGROUND

1. Technical Field

The present disclosure relates to machining indication lamps, and, more particularly, to an intellectual indication lamp device with countdown display that can display light signals and machining countdown.

2. Description of the Prior Art

With the economic competition and development, manufacturers introduce a variety of automatic machining apparatuses, in order to reduce the personnel cost, increase their profits, and promote the product yield. An automatic machining apparatus is generally provided with indication lamps, to indicate with different color of lamps to the operators the current operating states of the automatic machining apparatus.

However, the operators still cannot manage the automatic machining apparatus effectively even with the provision of the lamps. For instance, when monitoring multiple automatic machining apparatuses, each of which has its own dedicated operating state and machining time, the operators cannot control the machining time of each of the automatic machining apparatuses and understand the current machining state of each of the automatic machining apparatuses even with the help of the lamps. In the end, the problem of delaying the machining efficiency occurs.

Therefore, the conventional indication lamps do not have indicating variation, and the operators cannot control the operating state and the machining time of each automatic machining apparatus effectively, which is inconvenient for the operators to manage the automatic machining apparatus. Hence, how to solve the problem of the prior art is becoming an urgent issue in the art.

SUMMARY

In order to solve the problems of the conventional indication lamp, the present disclosure provides an indication lamp device, which can monitor an operating state of an apparatus machine effectively, and display the current machining countdown of the apparatus machine, allowing operators to control the operating state and machining time of the apparatus machine in time.

In order to achieve the above aspects, the present disclosure provides an indication lamp device with a countdown module, which comprises a lamp body structure and a controller. The lamp body structure is installed on an apparatus machine erectly. The lamp body structure has a body and a light guiding mask. An outer periphery of the body is provided with a time displaying module and a plurality of light emitting modules. The time displaying module is installed along an elongated direction of the body. The light guiding mask is transparent and has a receiving space for masking the body. The controller is coupled to the body and the apparatus machine. The controller has a signal receiving module for receiving an operating state signal of the apparatus machine, a light emission determining module for generating light emission indication information based on the operating state signal and controlling the light emitting module to emit light, and the countdown module provided with countdown information displayed on the time displaying module.

Therefore, the present disclosure uses the controller to monitor the operating state of the apparatus machine, to control the light emitting module to emit light, and to detect the machining time of the apparatus machine, and uses the time displaying module to display the current machining countdown, to allow operators to control the operating state and the machining time of the apparatus machine in time. Therefore, the present disclosure improves the efficiency of managing the apparatus machine and reduces the machining production cost.

BRIEF DESCRIPTION OF THE DRAWINGS

The disclosure can be more fully understood by reading the following detailed description of the embodiments, with reference made to the accompanying drawings, wherein.

DETAILED DESCRIPTIONS

Figure 1:
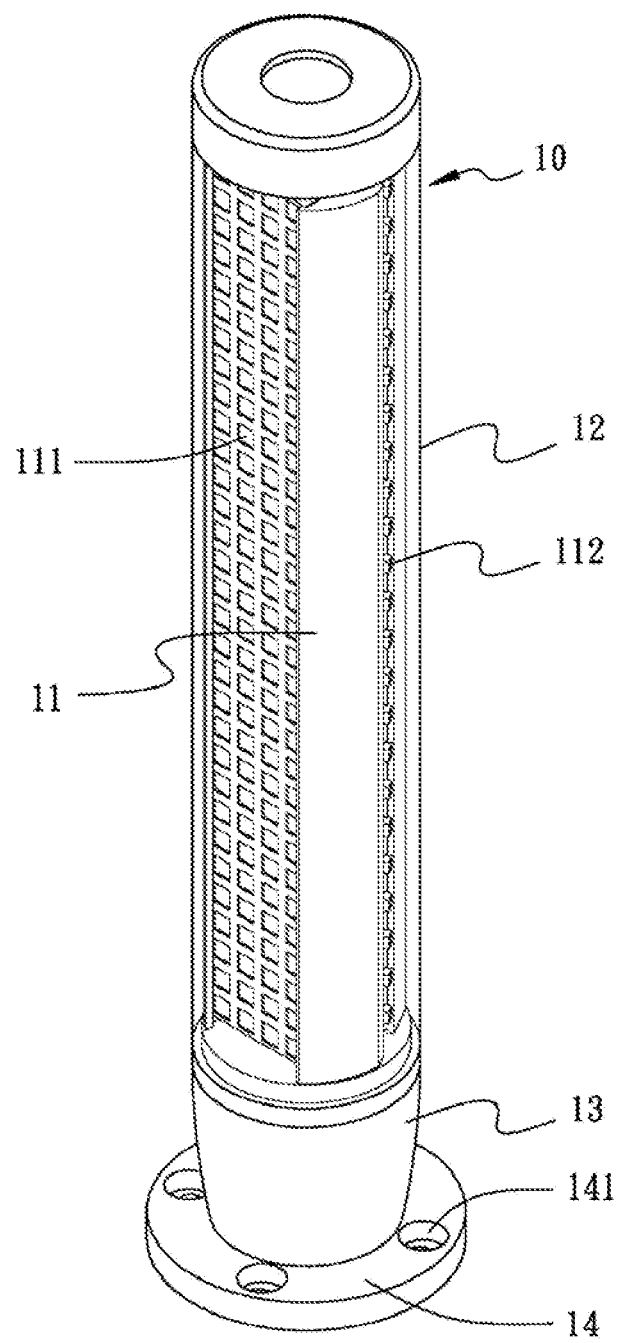
FIG. 1 is a perspective diagram of an indication lamp device according to the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
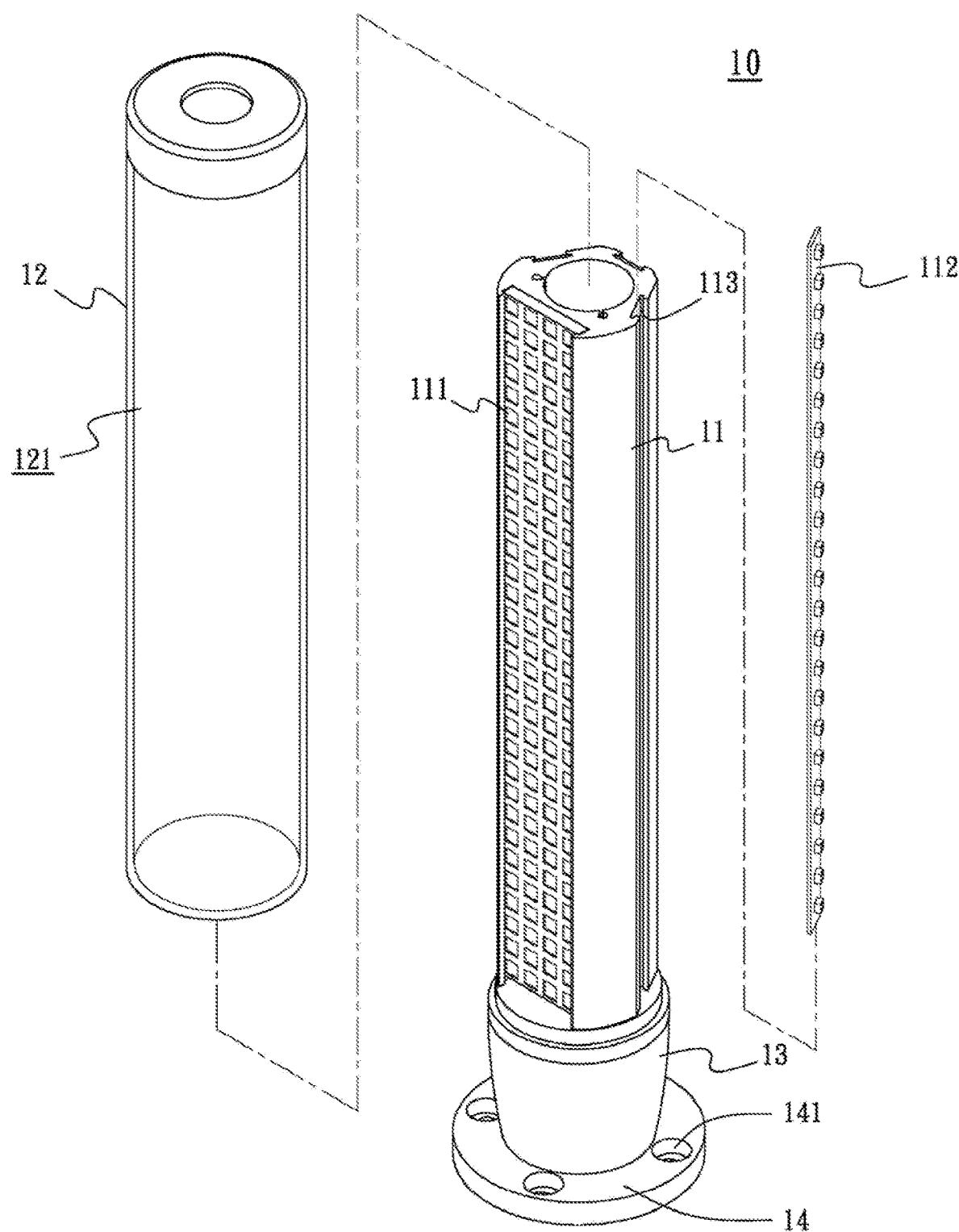
FIG. 2 is an explosive diagram of an indication lamp device according to the present disclosure.
Figure 3:
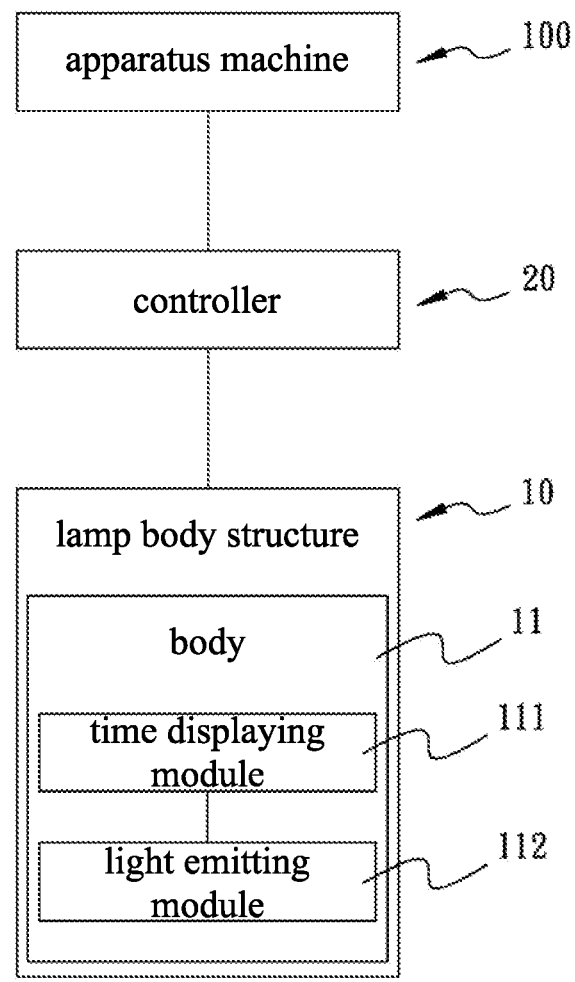
FIG. 3 is a functional block diagram of an indication lamp device according to the present disclosure.
Figure 4:
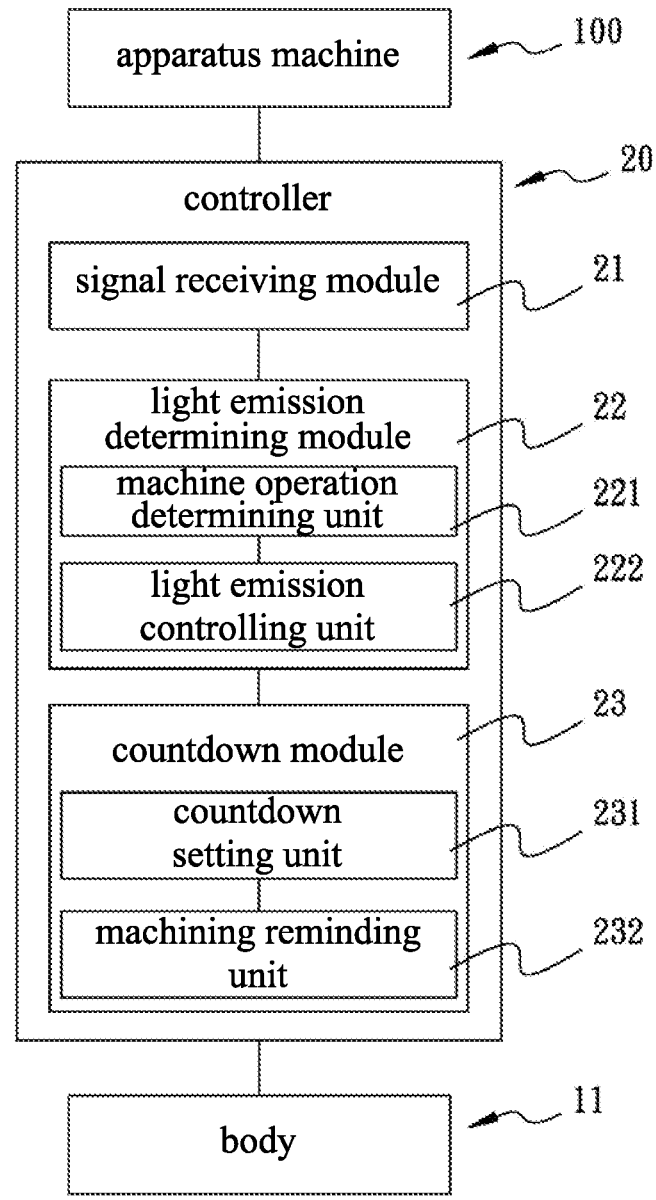
FIG. 4 is a functional block diagram of a controller of an indication lamp device according to the present disclosure.
Figure 5:
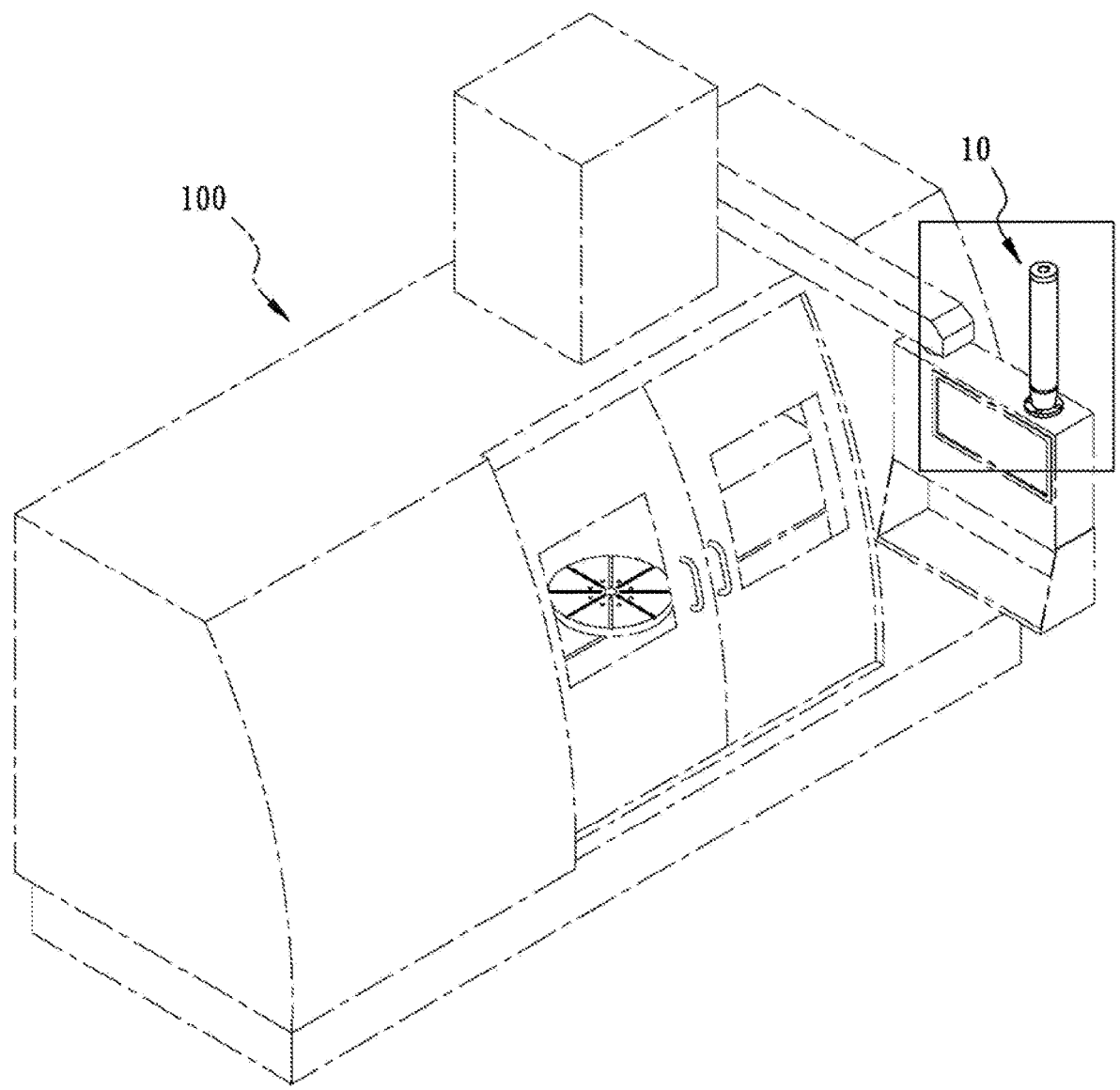
FIG. 5 is an operating state diagram of an indication lamp device installed on an apparatus machine according to the present disclosure.
Figure 6:
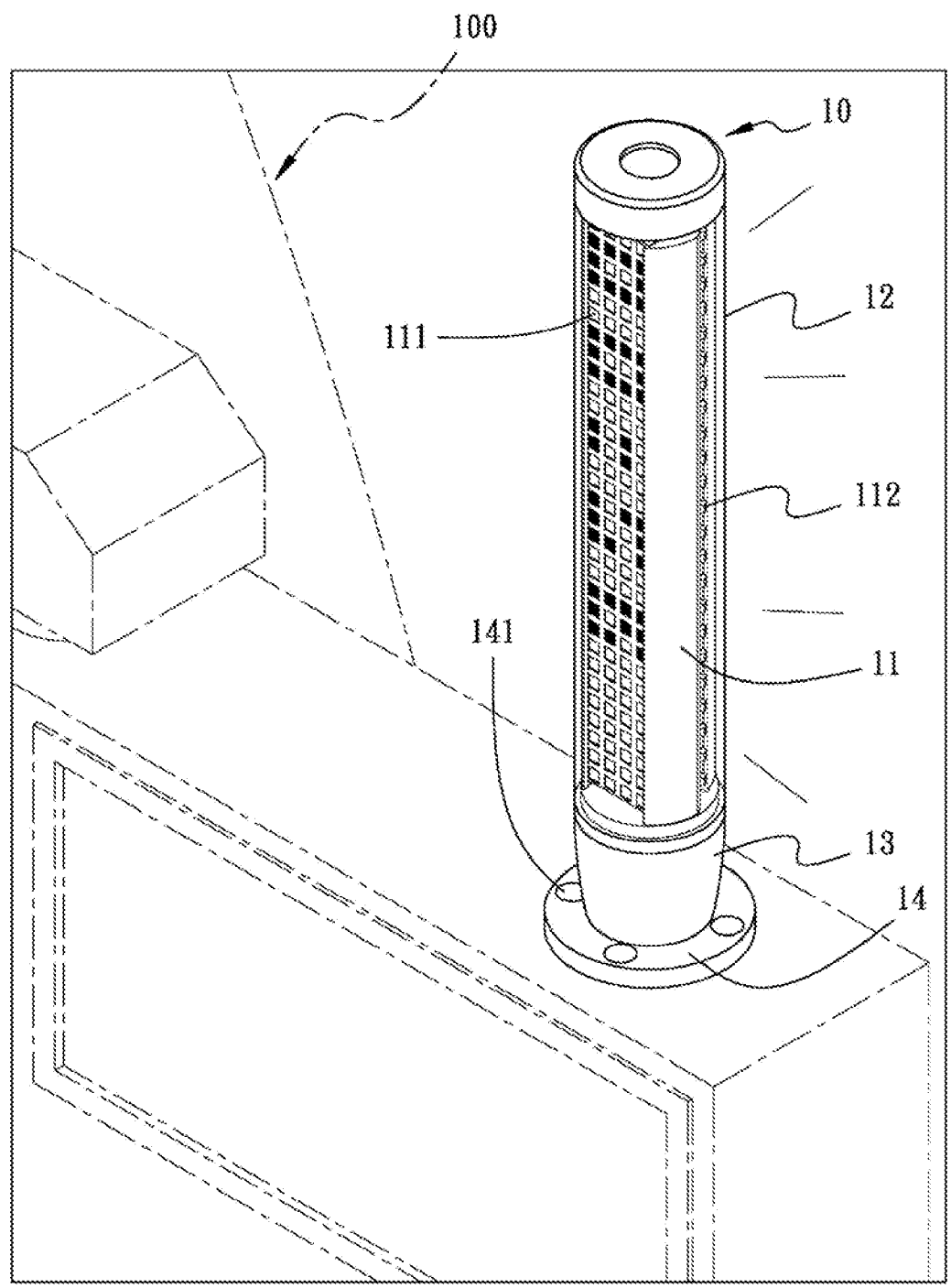
FIG. 6 is an operating state diagram of an indication lamp device that actuates light emission and displays the countdown according to the present disclosure.

Please refer to FIGS. 1-6. The present disclosure provides an indication lamp device with a countdown display, which comprises a lamp body structure 10 and a controller 20. The controller 20 controls an operating state of an apparatus machine 100, thereby achieving the objective of controlling the lamp body structure 10 to actuate light emission and display machining countdown.

The lamp body structure 10 has a generally cylindrical appearance, is erectly installed on the apparatus machine 100, and comprises a body 11, a light guiding mask 12 and a base 13. The outer periphery of the body 11 has a time displaying module 111 and a plurality of light emitting modules 112. The time displaying module 111 is a dot matrix display, and is installed on a lateral surface of the body 11 along an elongated direction of the body 11 for displaying the machining countdown of the apparatus machine 100. Each of the light emitting modules 112 is a light emitting diode bar. Three mounting grooves 113 are provided at the outer periphery of the body 11 along the elongated direction, for the light emitting modules 112 to be mounted thereinto.

The light guiding mask 12 is transparent, and has a receiving space 121. The base 13 is installed between the apparatus machine 100 and the body 11. In an embodiment, the body 11 is installed at the top end of the base 13, the light guiding mask 12 is detachably connected to the base 13, and the receiving space 121 of the light guiding mask 12 masks the body 11. The base 13 has a base disk 14 at a bottom end thereof. The base disk 14 is provided with a plurality of locking holes 141, which lock the lamp body structure 10 to the apparatus machine 100.

The controller 20 is coupled to the body 11 and the apparatus machine 100. The controller 20 has a signal receiving module 21, a light emission determining module 22 and a countdown module 23. The signal receiving module 21 receives an operating state signal of the apparatus machine 100 in a wired or wireless manner. The light emitting determining module 22 determines the operating state signal and generates light emission indication information to control the light emitting module 112 to emit light. The light emission determining module 22 has a machine operation determining unit 221 for receiving and determining the operating state signal and generating the light emission indication information, and a light emission controlling unit 222 for controlling the light emitting module 112 through the light emission indication information to generate light of different color for displaying purpose.

In an embodiment, the machine operation determining unit 221 can be used to monitor and determine the operating state of the apparatus machine 100. For instance, when determining that the apparatus machine 100 is in an actuating state based on the operating state signal, the machine operation determining unit 221 generates green light as the light emission indication information, to indicate to the operators that the apparatus machine 100 is machining; when determining that the apparatus machine 100 is in a standby state based on the operating state signal, the machine operation determining unit 221 generates yellow light as the light emission indication information, to remind the operators that the apparatus machine 100 ends machining; and when determining that the apparatus machine 100 is abnormal based on the operating state signal, the machine operation determining unit 221 generates red light as the light emission indication information, to alert the operators that the apparatus machine 100 is malfunctioned currently and needs to be repaired immediately.

The countdown module 23 is provided with countdown information, which is displayed by the time displaying module 111. The countdown information are, but not limited to minute counts and second counts. The countdown information can also be represented by patterns. The countdown module 23 has a countdown setting unit 231 and a machining reminding unit 232. The countdown setting unit 231 is used for storing and setting the countdown information. As the machining operation determining unit 221 determines that the apparatus machine 100 is in the actuation state, the countdown unit 231 transmits the countdown information to the time displaying module 111 to display the countdown information. The machining reminding unit 232 is used for setting a reminding time value. As the countdown information is lower than the reminding time value, the machining reminding unit 232 generates a reminding signal, and the time displaying module 111 flashes based on the reminding signal.

For instance, please referring to FIGS. 2-6, as the apparatus machine 100 is in the actuation state, the controller 20 determines that the apparatus machine 100 is in the actuation state and controls the light emitting module 112 to emit green light, to remind the operators that the apparatus machine 100 is machining, and the countdown module 23 displays the countdown information through the time displaying module 111 directly. Even if managing a plurality of the apparatus machines 100, the operators can still control the operating states and the machining time of all the apparatus machines 100 based on the information displayed by the time displaying module 111 and the light emitting module 112, thus promoting the managing efficiency of the apparatus machines 100.

If the reminding time value is set to be 30 seconds, which is higher than the countdown information, the machining reminding unit 232 generates the reminding signal immediately, and the time displaying module 111 will flash based on the reminding signal to alert the operators that the apparatus machine 100 is going to end machining. Therefore, the convenience of managing the apparatus machine 100 is greatly improved.

When the apparatus machine 100 is malfunctioned, the controller 20 determines that the apparatus machine 100 is abnormal immediately, and controls the light emitting module 112 to emit red light, to alert the operators that the apparatus machine 100 is malfunctioned currently and the problem should be solved immediately.

In sum, the present disclosure can monitor the operating state of the apparatus machines 100 effectively, and can also display the current machining countdown of the apparatus machines 100, to allow the operators to control the operating state and machining time of the apparatus machines 100 in time.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An indication lamp device with a countdown module, comprising:
    a lamp body structure installed on an apparatus machine erectly and having a body and a light guiding mask, with an outer periphery of the body being provided with a time displaying module and a plurality of light emitting modules, wherein the time displaying module is installed along an elongated direction of the body, and the light guiding mask is transparent and has a receiving space for masking the body; and
    a controller coupled to the body and the apparatus machine and comprising a signal receiving module for receiving an operating state signal of the apparatus machine, a light emission determining module for generating light emission indication information based on the operating state signal and controlling the light emitting module to emit light, and the countdown module provided with countdown information displayed on the time displaying module.

2. The indication lamp device with the countdown module of claim 1, wherein the light emission determining module has a machine operation determining unit for generating the light emission indication information based on the operating state signal.

3. The indication lamp device with the countdown module of claim 2, wherein the light emission determining module further has a light emission controlling unit for controlling the light emitting module to emit light of different colors through the light emission indication information.

4. The indication lamp device with the countdown module of claim 3, wherein when the machine operation determining unit determines that the apparatus machine is in an actuating state, the light emission indication information is green light; when the machine operation determining unit determines that the apparatus machine is in a standby state, the light emission indication information is yellow light; and when the machine operation determining unit determines that the apparatus machine is abnormal, the light emission indication information is red light.

5. The indication lamp device with the countdown module of claim 1, wherein the countdown module comprises a countdown setting unit for storing and setting the countdown information and transmitting the countdown information to the time displaying module for displaying.

6. The indication lamp device with the countdown module of claim 5, wherein the countdown module further comprises a machining reminding unit for setting a reminding time value and generating a reminding signal for the time displaying module to flash based on the reminding signal when the countdown information is lower than the reminding time value.

7. The indication lamp device with the countdown module of claim 1, wherein the outer periphery of the body is provided with three mounting grooves along the elongated direction for the light emitting modules to be mounted thereinto.

8. The indication lamp device with the countdown module of claim 7, wherein each of the light emitting modules is a light emitting diode bar.

9. The indication lamp device with the countdown module of claim 1, wherein the lamp body structure further comprises a base, with the body being installed at a top end of the base and the light guiding mask being detachably connected to the base.

10. The indication lamp device with the countdown module of claim 9, further comprising a base disk installed at a bottom end of the base for locking the lamp body structure to the apparatus machine.

11. The indication lamp device with the countdown module of claim 1, wherein the time displaying module is a dot matrix display.

12. The indication lamp device with the countdown module of claim 11, wherein the countdown information are minute counts and second counts.

13. The indication lamp device with the countdown module of claim 1, wherein the lamp body structure has a cylindrical appearance.

* * * * *